May 10, 1966     L. BOCHIROL ETAL     3,250,684

CRYOGENIC APPARATUS FOR IRRADIATION AT LOW TEMPERATURES

Filed July 24, 1963     4 Sheets-Sheet 1

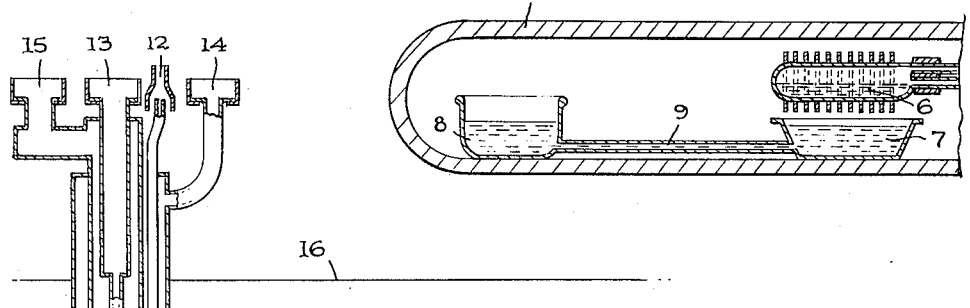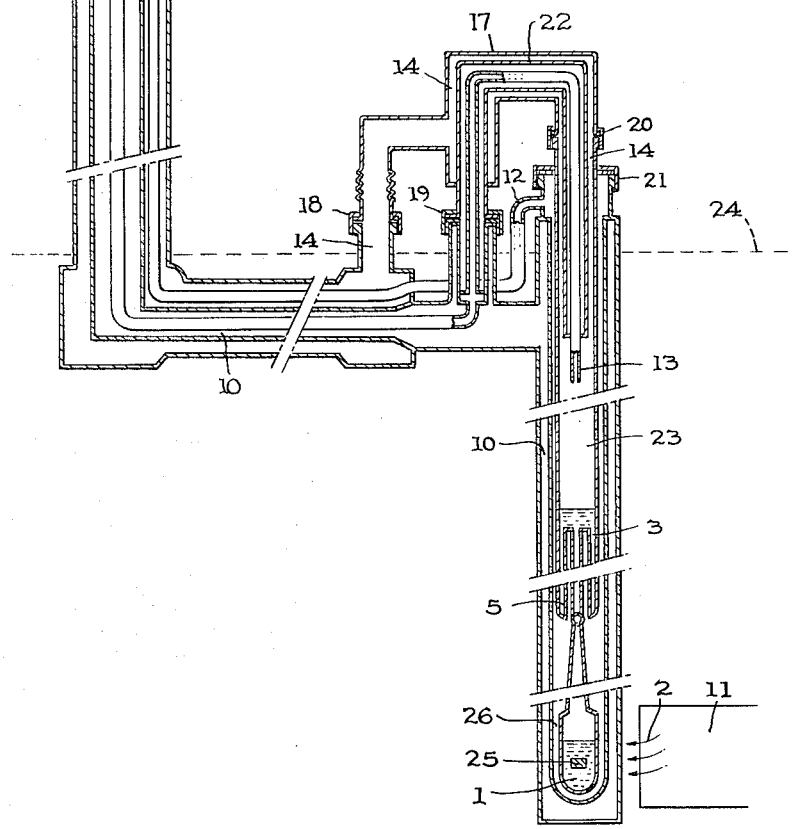

United States Patent Office 3,250,684
Patented May 10, 1966

3,250,684
CRYOGENIC APPARATUS FOR IRRADIATION
AT LOW TEMPERATURES
Louis Bochirol and Jacques Doulat, Grenoble, Isere, and
Louis Weil, La Tronche, Isere, France, assignors to
Commissariat a l'Energie Atomique, Paris, France
Filed July 24, 1963, Ser. No. 299,447
Claims priority, application France, Dec. 15, 1959,
813,080; May 18, 1960, 827,511; July 27, 1962,
905,341
6 Claims. (Cl. 176—62)

This application is a continuation-in-part of application Serial No. 74,116, filed December 6, 1960 by applicants herein and having the same title, which application Serial No. 74,116 has now become abandoned.

The present invention relates to a cryogenic method and apparatus for irradiation at low temperatures, particularly for a nuclear reactor.

It is known that it is advantageous to effect low temperature irradiations in order to study the chemical or physical modifications in solids or liquids subjected to ionizing radiation or the flux of particles. Liquid nitrogen is often used as the cooling medium, but liquid hydrogen, liquid helium, their isotopes or other liquids which have a boiling point below room temperature can also be used; the source for effecting the irradiation is a nuclear reactor, a particle accelerator or a radioactive substance.

In certain cases, the studied thing is a specimen immersed in a cryogenic liquid or in contact with it while exposed to radiation. In other cases, it is the modification of the properties of the cryogenic liquid under the action of radiations which is studied.

Various difficulties must be overcome in the use of low temperature irradiation apparatus.

Some of these difficulties are in relation with the secondary effects of radiation on impurities in the cooling fluids.

Thus, when commercial liquid nitrogen which is cheap and available in large quantities is used and is left to vaporise under the joint influences of radiations of nuclear origin and thermal losses of the container, difficulties occur because of the oxygen and argon which it contains as impurities.

Under the action of gamma radiation in particular, the oxygen gives rise to the formation of ozone which, because of its high boiling point as compared with the boiling point of nitrogen, tends to concentrate. This ozone is the cause of severe corrosion of the material. Also, it is liable to cause explosions, either by reaction with even smaller quantities of organic substances or spontaneously, which result in the partial destruction of the apparatus, as has often happened in the past.

Under the action of neutrons, the argon gives a radioactive isotope which contaminates the vaporising nitrogen.

Efforts have been made to overcome these disadvantages by using a closed circuit; the quantity of ozone is thus limited and the argon is not discharged into the atmosphere. Nitrogen of high purity is used as the cooling liquid in the part of the apparatus which is subjected to an intense flux of radiation; cooling is provided by means of an exchanger, the cooling circuit of which is supplied with impure commercial liquid nitrogen of high purity and the cooled circuit by the liquid nitrogen mentioned above; this exchanger is placed outside the reactor or away from the radioactive source, where it is possible to use impure commercial liquid nitrogen because of the absence of radiation.

However, the use of a recycling circuit for the fluid has many disadvantages as compared with the method which consists simply of assuring the continuous renewal of the cooling fluid. In fact, up to the present time it has been necessary to construct an apparatus comprising, on the one hand, an irradiation receiver and, on the other hand, an exchanger which may or may not be connected with liquefying apparatus, such as a compressor and expansion valve, the connection between these two parts being effected by insulated pipe-lines and the liquid being circulated by a pump, for example. Such installations are expensive, complex and have a high consumption of cooling fluid, because of the length of the connecting pipe-lines which it is difficult to insulate satisfactorily.

When it is desired to study the physical or chemcal modifications of a fluid under the influence of radiations at low temperatures, this recycling has always been indispensable for ensuring a reasonable concentration of the modifications or the newly formed substances. In addition to the above-mentioned difficulties encountered in conjunction with recycling, the apparatus used at present is very bulky; generally speaking, more particular interest has been shown in a reduction of the size of the recycling apparatus, which in some cases is at present prohibitive, each time a rare or expensive medium ($He^3$, D . . . ) has been used, either as a cryogenic fluid or as the object of the study.

Finally, generally speaking, all apparatus for irradiation must satisfy two requirements which are usually incompatible:

The device must provide shielding against radiation leak, to the outside.

The enclosure in which the specimens are treated must nevertheless be readily accessible.

The interposition of an absorbent screen, such as lead or paraffin wax, in the path of the radiation emanating from the apparatus is a standard and effective solution to the first requirement, but it reduces considerably the possibilities of easy access to the specimens.

In the case of irradiations at low temperatures, the necessity for ready accessibility is particularly important. In many cases, after irradiation, the treated specimen must be withdrawn from the apparatus while maintaining it at a low temperature; it is necessary to work quickly. It is therefore essential to satisfy the aforesaid requirements in connections in this type of installation, which are necessarily independent, are a further source of difficulty.

The present invention relates to a cryogenic method and apparatus for irradiation at low temperatures which allows the continuous recycling of a reduced volume of the fluid which is being studied or which is being used as a cooling liquid, to be realised in a simple manner and the aforesaid requirements to be satisfied.

This method is characterised in that the continuous circulation of the cryogenic fluid is effected in a sealed enclosure of reduced dimensions, which is thermally insulated, between a part of this container where an intense flux of radiation prevails and an adjacent part where the radiation flux is weak and where the vapours of the fluid condense in a cooled exchanger.

The apparatus acccording to the invention consists of a thermally insulated, sealed enclosure of reduced dimension, comprising two main parts: a cryogenic bath located within an intense radiation flux and a cooled exchanger located near the bath but in a zone where the radiation flux is weak.

According to a preferred feature of the invention, the release of energy in the walls, in the fluid and in the specimen which is to be immersed therein (a typical value of this release can be of the order of a tenth of a watt per gram), causes vaporisation of part of the liquid. The vapours formed condense in the exchanger, which is so arranged that the liquid resulting from the condensation returns under gravity to the irradiation container.

Another essential characteristic of the invention is that the advantages of continuous recycling of the fluid (elimination of the risk of explosion, possibilities of concentrating the effects of the irradiation, possibilities of using smaller amounts of cryogenic fluid) are obtained with a simple apparatus. It has none of the disadvantages of known apparatus which are due to the connecting pipelines, the separate exchanger and outer circulation pump. As a result, the apparatus is less complex, less expensive, more reliable in operation and more economical as regards the cooling fluid.

According to an alternative arrangement, the cryogenic apparatus for low temperature irradiation according to the present invention is characterised in that disconnection of the longitudinal axes of the upper and lower parts, thus avoiding any possibility of direct radiation from the core of the reactor towards the exterior, is provided at a level such that the thickness of the moderator above the lower part is at least equal to the thickness of the efficient biological protection made by means of the material constituting the aforesaid moderator.

The cryogenic apparatus according to this alternative satisfies the requirements of simple and rapid access to the irradiation enclosure, and effective biological protection for the operators. Furthermore, this apparatus is of reduced over-all dimensions in the immediate vicinity of the vertical to the core of the reactor used for irradiation, which is particularly essential for use in a swimming pool reactor.

With reference to the accompanying diagrammatic FIGURES 1 to 4, various examples are described below of the application of the cryogenic method and apparatus for irradiation at low temperature according to the invention. In the drawings.

FIG. 2 is a vertical section of another form of apparatus according to the invention, adapted to a horizontal irradiation channel;

FIG. 4 is a vertical section of an apparatus specially adapted for use in swimming pool nuclear reactors;

Only those elements necessary for understanding the invention have been shown in the figures, corresponding elements in these figures having identical references.

Figure 1:
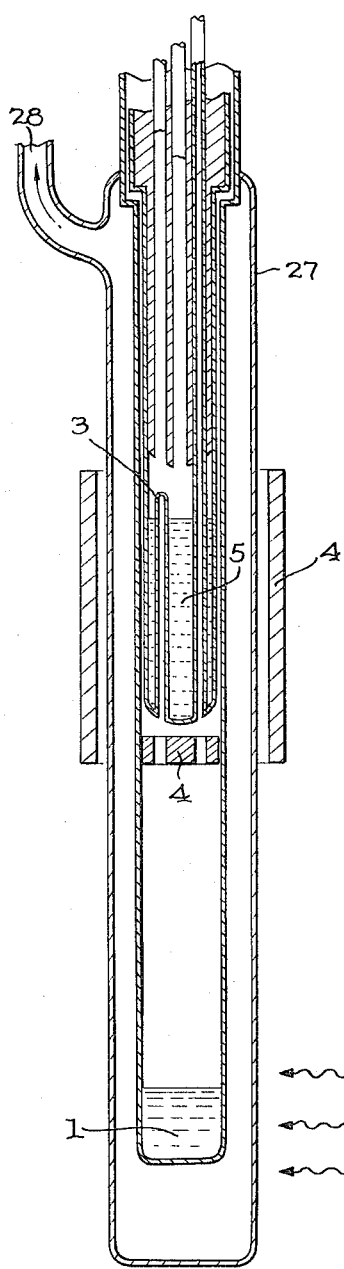
FIG. 1 is a vertical section of one form of apparatus according to the invention, adapted to a vertical channel of a nuclear reactor.

FIG. 1 shows a cryogenic bath 1 subjected to a flux of radiation 2. A condensation exchanger 3 is located near the bath 1, that is, the distance between them may vary from a few centimetres to a few meters, according to the distribution of the flux of radiation in the neighbourhood of the radiation source. It is always possible to reduce the spacing to a minimum by lessening the residual flux in the neighbourhood of the exchanger 3 with a protective screen 4, of lead for example, if necessary. Considering this suggestion, it is obviously important to make this distance as small as possible to obtain the benefits of the invention to the full.

The cryogenic bath 1 and the exchanger 3 are in a sealed enclosure 27 comprising a double wall in which a vacuum is created by means of piping 28.

In this embodiment, the exchanger 3 is of tubular type and contains a fluid 5 at low temperature, for example commercial liquid nitrogen, causing condensation of the vapours coming from the cryogenic bath 1.

The invention is not limited to the case where the apparatus is exactly vertical; it is also applicable when the sealed thermally-insulated enclosure is horizontal; as shown in FIG. 2, in this alternative the exchanger 6 is arranged such that the reflux of cryogenic fluid from a collector container 7 located beneath the exchanger 6 towards the irradiation container 8 is made possible by means of a tube 9. In other words, the invention is characterised by the fact that recycling is possible without using a pump or a compressor outside the enclosure 27 of reduced dimension.

It can also be seen that the invention is not limited to the use of a tubular exchanger as shown in FIG. 1; the exchanger can comprise coils, tubes fitted with cooling fins, as shown in FIG. 2, or any other form of exchanger commonly used in cryogenic apparatus.

The invention is not limited to a single design of the sealed, thermally-insulated enclosure. For ease of working and adaptation to experimental facilities of the radiation source, it is often necessary to adopt a cylindrical geometrical, but the invention can also be applied to an apparatus of square, polygonal or any section with or without an axis of symmetry.

The invention is applicable to all fluids used in low temperature technology. The condensation fluid (hereafter indicated by "A") used in the exchanger can be the same, apart from some impurities, as the cryogenic fluid (hereafter indicated by "B"). The pressure of "A" must be slightly lower than that of "B" so that condensation of the latter is possible. The difference in temperature and therefore in pressure, depends both on the exchange area and on the quantity of heat released, and is calculated according to the appropriate laws. "A" and "B" can be of a different constitution, the condition being then that the temperature of "A" under practical conditions must be lower than that of "B." Nevertheless, the fluid "A" must not allow freezing of "B."

Therefore, "A" can be commercial nitrogen, for example (principal impurities 0.5% oxygen, 0.01% argon), boiling under a pressure of one atmosphere, while "B" is highly purified nitrogen containing only a few parts per million of impurities. "A" can also be commercial nitrogen, boiling under a pressure of four atmospheres, "B" being methane. "A" can be hydrogen boiling under a pressure of one atmosphere, "B" being deuterium; "A" can be helium 4 boiling under a pressure of 240 mm. Hg, "B" being helium 3, though the fluids enumerated above are not given in any limiting sense.

Figure 3:
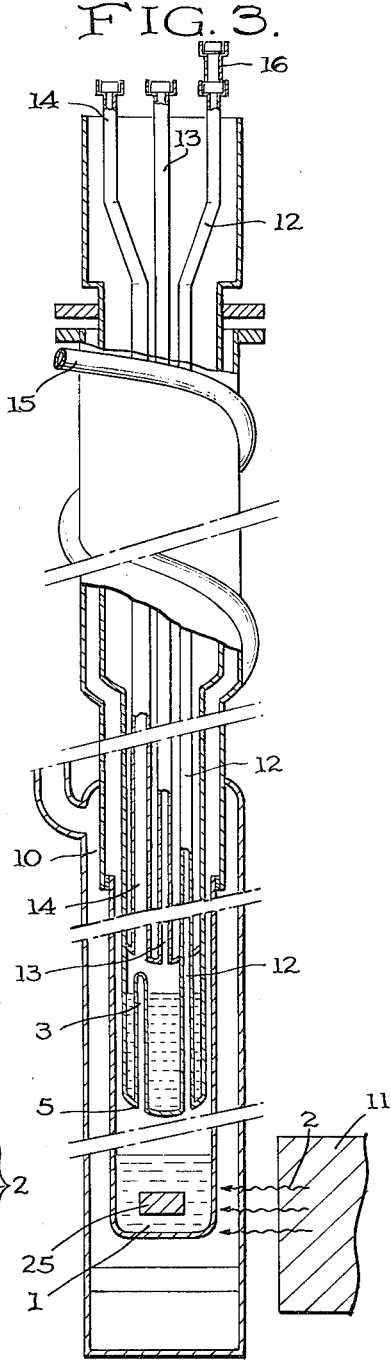
FIG. 3 is a more detailed vertical section of the apparatus shown in FIG. 1.

FIG. 3 shows an embodiment of the invention which permits irradiation of specimens at the temperature of liquid nitrogen in a high flux nuclear reactor.

The specimen 25 to be irradiated is immersed in a bath 1 of pure liquid nitrogen, contained in an aluminum enclosure with a diameter of 50 mm., protected by an evacuated insulation space 10. This part of the cryostat is subjected to an intense flux of radiation 2 from the core of a reactor 11. The exchanger 3 is filled with commercial liquid nitrogen 5 boiling under normal pressure; it is located at the upper part of the sealed enclosure at one metre above the bottom, in a weak flux of ionizing radiation. The nitrogen vaporised in 1 (by the energy released in the walls, the liquid and the specimens) is condensed in the exchanger 3 and returns, by gravity, to the lower part of the cryostat where the specimen is located.

Control of the level of highly purified liquid nitrogen is obtained by means of a pressure governed switch (not shown) connected to a tube 12 which is a junction to the sealed enclosure containing the pure nitrogen, introduced previously in the required quantity. This switch controls the supply of commercial nitrogen which is introduced into the apparatus by a tube 13. Evacuation of the commercial nitrogen vapours is effected by a tube 14. Tubes 15 and 16 serve to create and maintain the vacuums necessary for reducing thermal losses from the installation.

FIG. 4 represents an embodiment adapted for use in a swimming pool nuclear reactor. The cryogenic bath 1 is subjected to radiation 2 from the reactor core 11. This bath is disposed below the tubular exchanger 3 (at 1.3 m. in the example chosen) in the enclosure, and is protected from thermal loss by an evacuated insulation space 10. This can be maintained, for example, by means of pumps, by a single tube 15 in the apparatus including the path of the piping 13 for supplying the commercial liquid nitrogen. It can also be established once and for all and may or may not include known apparatus for reducing thermal losses. The piping 13 is used at 5 to introduce the cooling fluid into the exchanger. A tube 12 is connected to the sealed enclosure containing the highly purified nitrogen. Evacuation of the commercial nitrogen vapour is effected by a tube 14.

In this apparatus, a very effective biological protection is obtained. For this purpose, instead of extending the assembly of tubes constituting the installation in a straight line until it projects above the surface of the water as in the preceding apparatus, a discontinuity is provided between the upper emergent part of the apparatus and the lower part exposed to the radiation. This discontinuity between the axes of the upper and lower parts of the apparatus is situated a few metres below the level 16 of the water in which the installation is placed for irradiation. This height is not critical and can be varied according to the value of the radiation flux to be attained and the nature of the liquid in the pool, as will be well understood by those skilled in the art. The distance between the axes of the upper and lower parts obviously depends on the general arrangement adopted. It should be chosen in such a way that no direct radiation can pass from the core to the outside through the apparatus. A minimum value for the distance is of the order of the size of the exterior diameter of the apparatus or a corresponding dimension, but it can obviously be increased without inconvenience as much as is required; in order to diminish the cumbersomeness due to the outlet tubes of the installation vertically above the core, it has been chosen of the order of a metre.

The transfer piping assembly 17 which is disconnectable provides continuity of the circuit 13 for supplying the commercial liquid nitrogen, maintenance of the insulating vacuum between the double walls 22 and finally evacuation of commercial nitrogen in the peripheral part, for which the section of the passage is relatively large. Other arrangements can obviously be adopted for this tubing assembly, either by modifying the thermal insulation or the courses of the fluids.

After irradiation, there is ready access to the specimens and they can be taken out of the installation while maintaining them at the temperature of irradiation. For this, the apparatus is first raised until the water level corresponds to line 24; dismantling of the sealed joints 18, 19 and 20 then allows removal of the whole of the transfer assembly 17. The sealed joint 21 is then dismantled which permits withdrawal of the casing 23 supporting the exchanger tubing 3, from which is suspended the receiver 26 containing the samples 25 maintained at the temperature of the cryogenic bath. The arrangemen adopted thus makes it a simple matter to transfer the irradiated specimens to a cryogenic bath prepared for this purpose.

The apparatus has been installed in a nuclear reactor in which the neutron flux in the lower part of the cryostat was $5 \times 10^{12}$ neutrons/cm.$^2$/sec. and the gamma ray flux was $5 \times 10^7$ roentgen/hour. At the level of the exchanger, these values were reduced by a factor greater than $10^6$ with regard to the neutron flux and by a factor greater than $10^3$ for the gamma radiation. Experiments have shown that the resultant values can be considered as negligible, as far as the formation of ozone and radioactive argon is concerned.

For an energy of 50 watts dissipated in a bath of liquid nitrogen of 200 cm.$^3$ or in contact with it, and with an exchanger of 1600 cm.$^2$ surface, the excess pressure above the bath of highly purified nitrogen is less than 100 grams/cm$^2$.

The consumption of commercial liquid nitrogen is of the order of 70 litres per 24 hours, much below that of apparatus using an exchanger separate from the cryostat and a circulation pump for which several hundred litres are required in the same time.

It has been shown that the commercial nitrogen vapours consumed in the exchanger, which escape via the tube 14, do not have any measurable radioactivity, whereas prior tests have shown that irradiation of commercial nitrogen with continuous renewal in a flux such as that which exists in the lower part of the cryostat described leads, principally through activation of argon (a contaminant of commercial nitrogen), to a considerable radioactivity level of the vapours ranging from some hundredths to some tenths of a curie per metre$^3$. There is no longer any notable formation of ozone, even after several dozen hours of operation.

As noted above, the nature of the fluid employed under the designation "B" can be different from that of the fluid designated as "A".

This feature is of practical interest for the purpose of studying, for example, the irradiation behaviour of a fluid which is available in limited quantities, or in which it is sought to concentrate the radiolysis products which are formed. Thus, fluid "B" can be methane, while "A," which provides a cooling action in the heat exchanger, is nitrogen of commercial purity.

It is an advantage to use different fluids in respect of "A" and "B" when it is desired to effect irradiations of samples at very low temperature and to recover these latter without reheating after irradiation. In the case of irradiations in the vicinity of 20° K., "A" can be hydrogen which, as supplied in liquid form to the exchanger, imparts a cooling action to this latter and leaves it in gaseous form. In this case, it is an advantage to make use of the arrangements described above, inasmuch as these embodiments provide for a closed hydrogen cycle, the continuity of which is not impaired by the operations of charging and discharging of samples, which is an essential factor of operational safety. Fluid "B" can also be hydrogen, although both the design of the cryogenic irradiation device and the abovementioned charging operations can be greatly simplified if "B" is an inert fluid such as neon.

The present disclosure uses a combination of fluids "A" (which provide a cooling action in the exchanger) and "B" (cryogenic fluid proper) of different nature, but suggests a limitation in their use: this is especially the case when fluid "B" is liable to solidify at the boiling temperature of fluid "A".

It is possible in certain cases to circumvent this difficulty by increasing the pressure to which fluid "A" is subjected, thereby making it possible to adjust its boiling temperature to the appropriate value. This means, which has been mentioned above, makes it possible, for example to employ commercial nitrogen for "A" and methane for "B".

However, the need to maintain a relatively high pressure which can reach several times the normal pressure in the bath of fluid "A" is objectionable and complicates the construction of installations, requiring corresponding dimensional characteristics and design concepts of chambers, piping systems, vessels, supply valves, etc.

Figure 5:
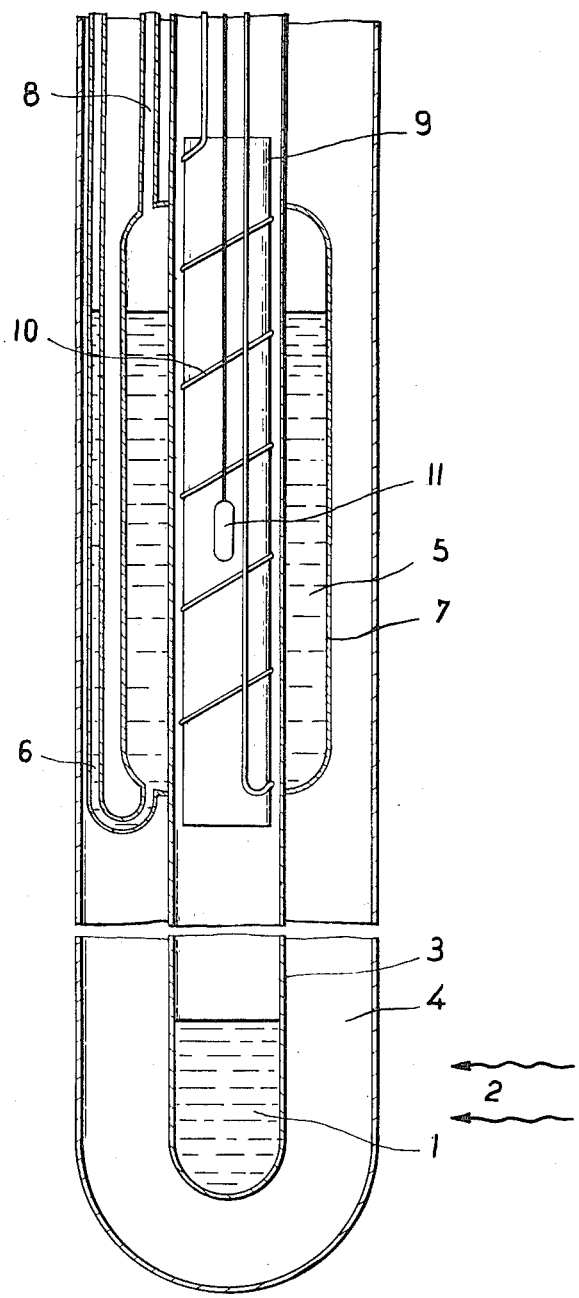
FIG. 5 is a general arrangement diagram of another embodiment of the present concept.
Figure 6:
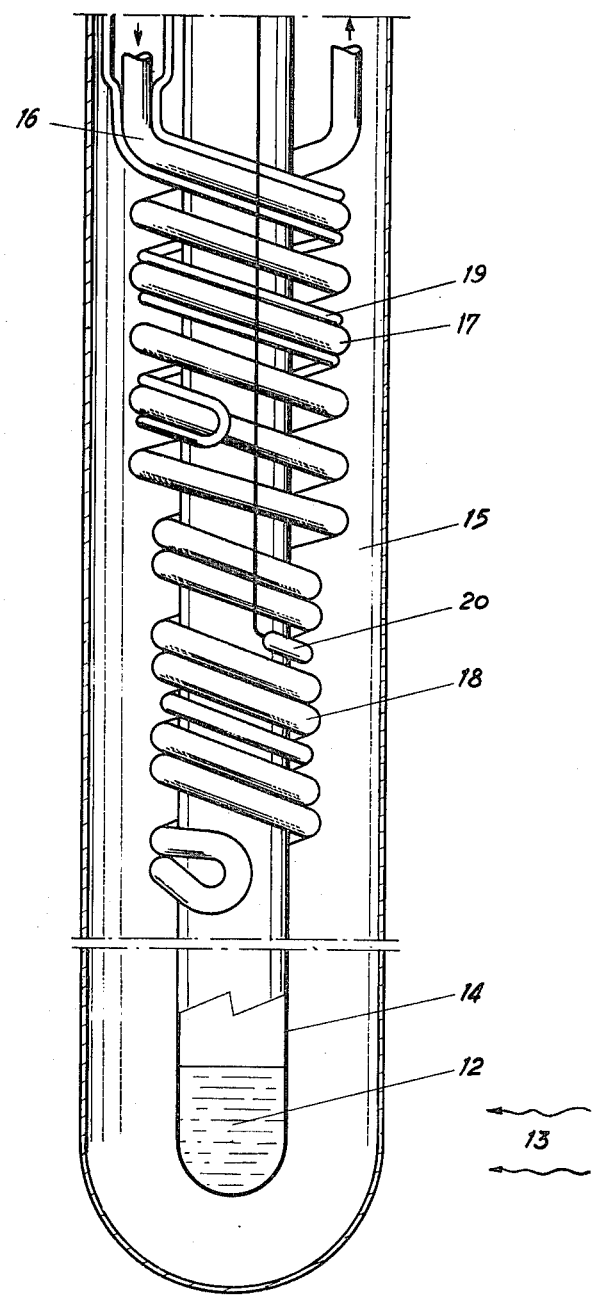
FIG. 6 is a view similar to that of FIG. 5 of still another embodiment hereof.

The embodiments of FIGS. 5 and 6 make it possible to secure all the advantages associated with the possibility of employing for "A" and "B" two fluids of different nature, while avoiding the disadvantages attendant on pressurization of the "A" fluid circuit, which is the only known method of adapting to a suitable value for the efficient operation of the device, the temperature of the condensation surface of the heat exchanger on which the fluid "B" is intended to become liquefied and not to solidify.

These embodiments are essentially characterized in that the condensation surface of the heat exchanger is brought to a suitable temperature, which is higher than that of the boiling temperature of fluid "A" at a pressure in the vicinity of normal pressure, by supplying to the said condensation surface a quantity of heat which is capable of effecting the regulation, and, by thermally decoupling on the one hand, a portion of the circulation system containing fluid "A" in which this latter boils under normal pressure and, on the other hand, the condensation surface of the heat exchanger.

According to a secondary feature of these embodiments, this addition of heat is supplied in the form of electric power.

The diagram of FIG. 5 relates to a cryogenic device for neutron irradiations in a swimming-pool reactor of the type generally described above wherein fluid "A" is liquid hydrogen which boils at 20.4° K. under normal pressure and fluid "B" is liquid neon which boils at 27.3° K. and solidifies at 24.5° K. under the same conditions.

There is shown in this diagram a partial cross-section of the device in which the cryogenic bath 1 proper as constituted by neon (fluid "B") is subjected to radiations 2 emanating from the nuclear reactor core. This bath is located in a closed chamber 3 in which the pressure is close to normal pressure and which is protected by an insulating vacuum space 4. The cooling fluid "A" is liquid hydrogen 5 which is fed continuously at 6 into an enlarged portion 7 of its circulation system which is located within the insulating vacuum space, the wall of this latter being common with the chamber 3. Fluid "A" boils therein at a pressure in the vicinity of normal pressure and the vapor which is given off by the said fluid returns at 8 to the hydrogen loop in which provision is additionally made for known liquefaction means.

The condensation surface proper is the internal surface of a copper tube 9, the diameter of which is slightly smaller than that of the closed chamber 3. A resistance type heater element 10 which is disposed over the condensation surface, and is in close thermal contact with the said surface, permits the utilization thereon of electric power which may be varied according to the indications supplied by a temperature detector 11 of the vapour pressure type which is commonly employed in cryogenics, and which is also fixed on the surface of the tube 9.

The liquid hydrogen 5 which boils at 7 at a pressure which is slightly higher than normal pressure maintains the wall of this portion of the circulation system, which is common with the chamber 3, at a temperature in the vicinity of 20° K. Neon solidifies within the space which is formed between the chamber 3 and the tube 9, the internal surface of which is the heat transfer surface proper. Thus, the thermal resistance is constituted which effects the necessary decoupling between the heat transfer surface and that portion of the circulation system containing the fluid "A" in which this latter boils at a pressure in the vicinity of normal pressure.

The maintenance of the temperature of the heat transfer surface above 24.5° K. is ensured by supplying the necessary electric power to the heating coil 10 according to the indications provided by the thermostatic element 11, which makes it possible in a first stage to liquefy the necessary quantity of neon at 1 within the irradiation chamber and then to condense the neon vapors derived from 1 as a result of the dissipation of energy of the radiations 2 in the walls, in the liquid itself, and in the sample which may be immersed therein.

In suitable apparatus constructed in accordance with the embodiment just described, the closed chamber 3 has a diameter of 30 mm., the clearance between this latter and the copper tube 9 being 0.5 mm. With a heat transfer surface area of 300 cm.² and a continuous delivery of liquid hydrogen of 12 liters per hour, there is available for use in the bath a cooling power of 80 watts. The electric power which is necessary for regulating the temperature of the condensation surface proper is zero in steady-state operation at maximum power, and acquires intermediate values which reach 80 watts when no power is dissipated in the bath 1. This supply of electric power can be carried out either in continuous operation or under pulse conditions but always in dependence on the indications of the thermometric element 11.

The embodiment of FIG. 6 relates to another practical application of the present invention as also adapted to a cryogenic device for neutron irradiation processes in a swimming-pool reactor. The fluid "A" is liquid nitrogen which boils at 77.3° K. at normal pressure and fluid "B" is liquid methane which boils at 111.8° K. and solidifies at 89° K. under the same conditions.

FIG. 6 shows a partial diagrammatic cross-section of the device. The cryogenic bath 12 proper is methane (fluid "B") which is subjected to radiations 13 emanating from the nuclear reactor core. The bath is contained in a closed chamber 14 in which the pressure is slightly higher than normal pressure and which is protected by an insulating vacuum space 15. The cooling fluid "A" is liquid nitrogen, which is supplied through a pipe 16 and feeds a tube system which is spiralled around the chamber 14. In the upper portion 17, this tube system is thermally decoupled from the chamber 14 by means of the insulating vacuum 15. In its lower portion 18, the said tube system is brazed onto the chamber 14 and in close thermal contact therewith. An electrical resistance type heater element 19 is brazed to the top portion 17 of the nitrogen loop. A thermometric element 20, which is brazed to the lower portion, measures the temperature of the wall of chamber 14 which constitutes the heat transfer surface.

The liquid nitrogen which is supplied at 16 boils at a pressure which is little different from the normal pressure within the portion 17 of the spiral tube which is thermally decoupled with respect to the chamber 14.

The temperature of the heat transfer surface, as measured by the thermometric element 20, is set at a value which is higher than 89° K. and provides the resistance type heater element 19 with the power which is necessary for a suitable vaporization of the liquid nitrogen in the portion 17 of its circuit.

For an effective heat transfer surface area of 1600 cm.², there is made available in the bath 12 a cooling power capacity of 100 watts, the delivery of liquid nitrogen being 5 liters per hour. As previously stated, the electric power, which is necessary for the regulation, is zero when the maximum power is dissipated at 12, and is located at the highest levels when this latter decreases. It reaches 100 watts when the power dissipated at 12 is zero.

It will be noted that in these two embodiments of the invention the thermal decoupling is obtained by different means; condensation of a solid phase in one; and combined use of an insulating vacuum space and a partially vaporized fluid in the other. All known means for the creation of a thermal resistance between the two portions of the device can be employed without departing from the scope of the invention.

Moreover, it will be noted that in these two embodiments, there is complete independence between the circuit "A" which provides a cooling source and the closed chamber containing the cryogenic fluid proper "B" which is subjected to radiation. The operations of sample-positioning inside the closed chamber containing the cryogenic fluid "B," which is subjected to radiation, can therefore be carried out without dismantling and without any interruption of continuity of the "A" fluid circuit. This is particularly advantageous for reasons of operational safety when fluid "A" is liquid hydrogen.

It will be understood that the invention is not limited to the embodiments which have been described and illustrated and which have been shown solely by way of example.

What is claimed is:

1. A cryogenic device for low temperature irradiation in a swimming pool nuclear reactor comprising an elongated gas tight enclosure in the pool of the reactor, means for drawing an insulating vacuum in said enclosure, an elongated vertical fluid tight container in a lower portion of said enclosure, a bath receiving receptacle in a lower portion of said container subject to radiation flux from the reactor core, a heat exchange wall within said container not subject to the radiation flux of the reactor, a gravity condensate return path from said wall to said bath receiving receptacle, a circuit not subject to the radiation flux of the reactor and including said heat exchange wall and means for circulating a cooling fluid in said circuit and along said wall.

2. A swimming pool nuclear reactor, a pool container and a core for the reactor and a device as described in claim 1 mounted in and irradiated by said core, said device comprising a vertical part, a second vertical part spaced from and lower than said first part and a horizontal part connecting said vertical parts and located in said pool container whereby said pool container when filled with a liquid provides biological protection for operators above said horizontal part, the lower portion of said second vertical part containing said receptacle and said heat exchange wall.

3. A device for low temperature irradiation comprising a vacuum enclosure, a fluid tight container, a bath receiving receptacle in the lower portion of said container subject to radiation, a jacket about and spaced from a part of said container, means for circulating a cooling fluid in the space between said container and said jacket and a fluid cooled heat exchanger, said exchanger being located in a zone subject to low irradiation flux and above said receptacle, a gravity condensate flow path between said exchanger and said receptacle, said heat exchanger comprising a thermally-conductive member in and spaced from said container and within said jacket and an electrical resistor heater in close contact with said member for heating the surface of said member to maintain the surface of said member at a temperature above the freezing point of the bath.

4. A device as described in claim 3, said member being tubular and concentric with said container.

5. A device for low temperature irradiation comprising a vacuum enclosure, a fluid tight container in said enclosure, a bath receiving receptacle subject to intense flux of radiation in the lower portion of said container, a cooling circuit in a zone subject to low irradiation flux above said receptacle, a gravity condensate return path between said circuit and said receptacle, said cooling circuit comprising a first section about and spaced from said container and a second section about and in thermal contact with said container, means for circulating a cooling fluid in said circuit and electrical resistor heating means adjacent said first section for vaporising the cooling fluid and heating the vapour thereof in said first section.

6. A device as described in claim 5, said first section and said second section being helically wound around said container.

References Cited by the Examiner

UNITED STATES PATENTS

| | | | |
|---|---|---|---|
| 2,455,812 | 12/1948 | Schlesman | 204—154 |
| 2,530,699 | 11/1950 | Humphey et al. | 204—163 |
| 2,762,769 | 9/1956 | Smith | 204—163 |
| 2,811,486 | 10/1957 | Reynolds et al. | 204—163 |

OTHER REFERENCES

Sartain et al.: Review of Scientific Instruments (February 1958), pages 118 and 119.

JOHN H. MACK, *Primary Examiner.*

WINSTON A. DOUGLAS, *Examiner.*

H. S. WILLIAMS, *Assistant Examiner.*